(No Model.)
W. L. FAY.
DIRT SCRAPER.
No. 245,147.  Patented Aug. 2, 1881.
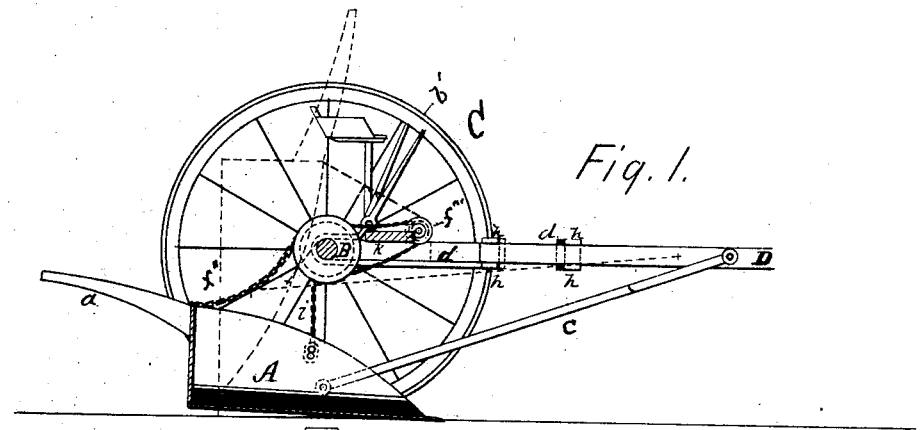
Fig. I.
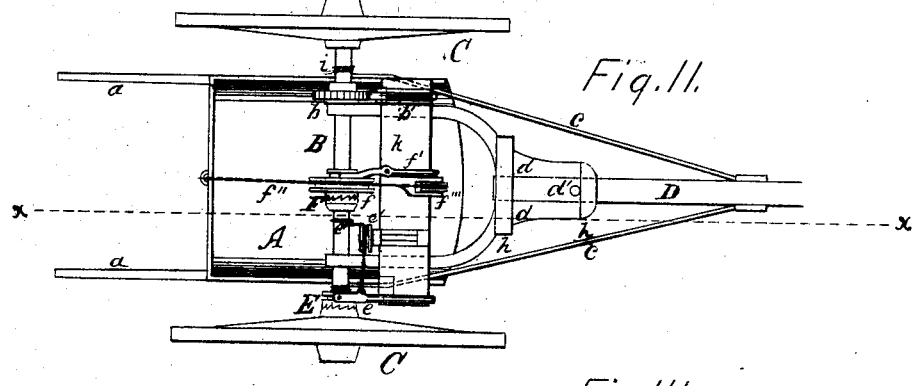
Fig. II.
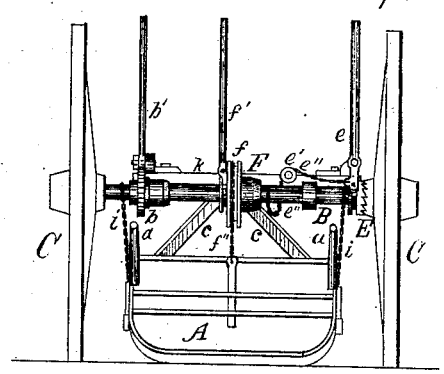
Fig. III.
Witnesses.
H. F. Willson.
Henry K. Day
Inventor.
W. L. Fay.

UNITED STATES PATENT OFFICE.

W. LAMARTINE FAY, OF ELYRIA, OHIO.

DIRT-SCRAPER.

SPECIFICATION forming part of Letters Patent No. 245,147, dated August 2, 1881.

Application filed April 22, 1881. (No model.)

*To all whom it may concern:*

Be it known that I, W. LAMARTINE FAY, of Elyria, in the county of Lorain and State of Ohio, have invented a new and useful Improvement in Dirt-Scrapers, of which the following is a specification.

The invention relates to dirt scrapers or excavators for excavating, grading, or moving dirt in making railroads, highways, ditches, cellars, or any place where it is desirable to remove dirt, earth, sand, gravel or the like short distances.

Heretofore such scrapers have been so constructed as to slide on the ground when loaded, or so mounted on wheels as to be objectionable.

The object of my invention is to provide a dirt scraper or excavator so arranged that it will be simple and practical, be easily worked, of light draft, and capable of removing large quantities of earth in a short space of time.

In the accompanying drawings, in which similar letters of reference indicate like parts, Figure I is a view of a vertical section of Fig. II in the dotted line $xx$. Fig. II is a plan view, and Fig. III is an end elevation. The dotted lines in Fig. I show the position of the scoop A and pole D when dumping.

In the drawings, A represents the scoop, which is substantially in form as seen in Figs. I and II, of any suitable length on the front or cutting edge, and extends to the rear a suitable distance from said edge, having on its sides and across the rear end a suitable flange, as seen in the drawings. About two-fifths of the way back from the front edge of the scoop A, and to the sides thereof, are pivoted two draw-bars, $c$ $c$, of suitable strength, which extend forward to and are pivoted to the pole D. Near the center of the upper edge of the flanges, to the sides of said scoop A, are pivoted or attached, by any suitable device, the lifting-chains $i$ $i$.

B represents a revolving axle, which at its ends is mounted on wheels C C of any suitable size. Said axle B is cylindrical in form, and of any suitable diameter to give the required strength, and is provided with a ratchet-wheel, $b$, a clutch, E, a pulley, $f$, operated by the clutch F, or rigidly attached to the axle and the chains $i$ $i$. The chains $i$ $i$ are secured rigidly to the axle B, by any suitable means, and extend downward to the upper edge of the side flanges of the scoop A. One-half of the clutch E is rigidly secured to one of the wheels C, and the other one-half secured to said axle B, so as to allow it to slide on said axle but not revolve. To said axle B, by any suitable device, are also attached the hounds $d$ $d$; and on one side of said hounds is attached the lever $b'$, for the purpose of engaging the ratchet $b$; also, to said hounds $d$ $d$, by means of a suitable board, $k$, securely fastened across the top thereof, is fastened the lever $e$, of any suitable length, for the purpose of operating said clutch E; also, the lever $f'$, of any suitable length, for the purpose of operating pulley $f$ and clutch F; also, pulley $f'''$, of suitable size to carry chain $f''$, and also pulley $e'$, carrying the chain $e''$ attached to axle B, and clutch-lever $e$, for the purpose of disengaging clutch E. There may be a seat also attached to said board $k$ for a driver. The front ends of said hounds $d$ $d$ are rigidly secured a suitable distance apart by means of the metal straps $h$ $h$ $h$ $h$, so as to allow the pole D to slide freely between the same. The hounds $d$ $d$ are of suitable length and size to give the room necessary for the driver and the attachment of said levers, pulleys, and seat. The straps $h$ $h$ and $h$ $h$ are placed sufficiently far apart to allow said pole D to slide a suitable distance. The hounds $d$ $d$ are secured to said axle B by any suitable device that will admit of said axle B revolving, as metal straps. The pole D is of any suitable length and size, and is straight at the rear end where it slides between said hounds $d$ $d$. The pole D is inserted between the hounds $d$ $d$, and a small pin, $d'$, is inserted, at a suitable distance from the rear end, between said straps $h$ $h$ and $h$ $h$, to prevent said pole D being drawn out.

To the pole D, at a suitable distance in front of said hounds $d$ $d$, are pivoted the draw-bars $c$ $c$. In front of said hounds $d$ $d$, to said pole D, may be secured a strap and bolt for the purpose of attaching a team.

The chain $f''$ is attached by one end to the face of the pulley $f$, and at the other end to the rear flange of scoop A, and when pulley $f$ is operated it is wound up on said pulley $f$, thereby drawing up and forward rear end of scoop A. In case the pulley $f$ is rigid upon the axle, said chain $f''$ is slack enough not to raise or elevate rear end of scoop A until after chains $i\ i$ have raised scoop A a sufficient height for transportation.

The operation of my invention is as follows: The clutch E, pulley $f$, (in case a clutch, F, be used,) and ratchet $b$ are disengaged, which permits said scoop A to rest on the ground. The scraper is drawn forward, the handles $a\ a$ properly elevated, so that the scoop A may fill. When this is done the handles $a\ a$ are depressed, the clutch E is engaged by means of the lever $e$, which causes said axle B to revolve until said scoop A is sufficiently elevated by means of the chains $i\ i$ winding around said axle B, when said clutch E may be disengaged, and said ratchet $b$ will hold said axle B and prevent said chains $i\ i$ unwinding, and said scoop A and its load can be then transported any desired distance, supported only by said wheels C C. The scoop A may be dumped, when in this situation, by raising up on the handles $a\ a$, or by engaging said clutch E, which will revolve said axle B and operate said pulley $f$ and chain $f''$, and when the rear end of scoop A is sufficiently elevated to dump, said chain $e''$, being wound up on said axle B, will operate over said pulley $e$ and disengage said clutch E.

In dumping the scoop A the draw-bars $c\ c$, operating on the pole D, draw the same back sufficiently to allow said scoop to be easily dumped, and as soon as the scoop assumes a horizontal position the pole D resumes its former position.

I have knowledge of scrapers being heretofore constructed with a revolving axle and chains attached thereto connected to the draw-bars for elevating the front end of the scoop, and I make no claim thereto. I also have knowledge that scrapers have heretofore been constructed with a revolving axle, and chains extending therefrom to the scoop thereof, for the mere purpose of raising and lowering said scoop, and I make no claim thereto; and in all such cases it has heretofore been deemed necessary to have four chains, or more, for the purpose of preventing said scoop from tilting and discharging the load when raised from the ground, and the whole has been so constructed that it has been impossible to dump said scoop, either before or after raised, by overturning the same.

What I claim is—

1. The revolving axle B, in combination with the chains $i\ i$, scoop A, draw-bars $c\ c$, and a pole, all so combined that when said scoop A is raised from the ground said draw-bars $c\ c$ will operate as a brace and prevent said scoop A from tilting and discharging its load, and will also permit said scoop A to be dumped or overturned forward, when desired, by elevating the rear end of said scoop A.

2. The scoop A, in combination with the chain $f''$ and pulley $f$, attached rigidly to said axle B, constructed and operated in the manner and for the purpose substantially as described.

3. The sliding pole D, in combination with the scoop A and draw-bars $c\ c$, constructed and operated in the manner and for the purpose substantially as described.

4. The revolving axle B, in combination with the clutch E, chains $i\ i$, pulley $f$, chain $f''$, and scoop A, constructed and operated in the manner and for the purpose substantially as described.

5. The combination of the sliding pole D, axle B, draw-bars $c\ c$, pulley $f$, chain $f''$, clutch E, chains $i\ i$, and scoop A, constructed and operated in the manner and for the purpose substantially as described.

W. LAMARTINE FAY.

Witnesses:
ORLO C. NELSON,
EDWARD C. MANTER.